United States Patent
Dobson et al.

(10) Patent No.: US 7,092,426 B2
(45) Date of Patent: Aug. 15, 2006

(54) MATCHED FILTER FOR SCALABLE SPREAD SPECTRUM COMMUNICATIONS SYSTEMS

(75) Inventors: W. Kurt Dobson, Sandy, UT (US); Dirk Ostermiller, Holladay, UT (US); Sy Prestwich, Riverton, UT (US); Scott Bevan, Lehi, UT (US)

(73) Assignee: S5 Wireless, Inc., Draper, UT (US)

( * ) Notice: Subject to any disclaimer, the term of this patent is extended or adjusted under 35 U.S.C. 154(b) by 255 days.

(21) Appl. No.: 10/670,708

(22) Filed: Sep. 24, 2003

(65) Prior Publication Data

US 2005/0074054 A1    Apr. 7, 2005

(51) Int. Cl.
*H04B 1/69* (2006.01)
(52) U.S. Cl. .................................................. 375/130
(58) Field of Classification Search ............... 375/130, 375/141, 135, 136, 143, 146, 147, 152, 142; 370/320, 335, 441, 342
See application file for complete search history.

(56) References Cited

U.S. PATENT DOCUMENTS

| | | | |
|---|---|---|---|
| 4,351,064 A | 9/1982 | Ewanus | 455/29 |
| 4,953,178 A | 8/1990 | Ishigaki | 375/1 |
| 4,977,578 A | 12/1990 | Ishigaki et al. | 375/1 |
| RE33,875 E | 4/1992 | Tsuchiya | 375/1 |
| 5,136,612 A * | 8/1992 | Bi | 370/342 |
| 5,319,672 A | 6/1994 | Sumiya et al. | 375/1 |
| 5,400,359 A | 3/1995 | Hikoso et al. | 375/1 |
| 5,471,509 A | 11/1995 | Wood et al. | 375/350 |
| 5,546,424 A * | 8/1996 | Miyake | 375/141 |
| 5,737,368 A | 4/1998 | Shou et al. | 375/343 |
| 5,740,096 A | 4/1998 | Shou et al. | 364/825 |
| 5,790,588 A | 8/1998 | Fukawa et al. | 375/200 |
| 5,790,590 A | 8/1998 | Shou et al. | 375/200 |
| 5,815,055 A | 9/1998 | Eguchi et al. | 333/193 |
| 5,881,099 A | 3/1999 | Takahashi et al. | 375/206 |
| 5,909,461 A | 6/1999 | Koga et al. | 375/206 |
| 5,912,644 A | 6/1999 | Wang | 342/457 |
| 5,926,512 A | 7/1999 | Shou et al. | 375/343 |
| 5,974,082 A | 10/1999 | Ishikawa et al. | 375/206 |
| 5,991,332 A | 11/1999 | Lomp et al. | 375/206 |
| 6,031,415 A | 2/2000 | Shou et al. | 327/552 |
| 6,104,746 A | 8/2000 | Ishikawa et al. | 375/140 |
| 6,128,332 A | 10/2000 | Fukawa et al. | 375/146 |
| 6,154,482 A | 11/2000 | Inuzuka | 375/130 |
| 6,154,487 A | 11/2000 | Murai et al. | 375/150 |
| 6,212,219 B1 | 4/2001 | Shou et al. | 375/130 |
| 6,233,272 B1 | 5/2001 | Yugawa | 375/148 |
| 6,265,807 B1 | 7/2001 | Koga et al. | 310/313 B |
| 6,317,452 B1 | 11/2001 | Durrant et al. | 375/130 |
| 6,331,998 B1 | 12/2001 | Lin et al. | 375/143 |
| 6,333,925 B1 | 12/2001 | Tsubouchi et al. | 370/335 |
| 6,356,555 B1 | 3/2002 | Rakib et al. | 370/441 |
| 6,434,185 B1 | 8/2002 | Struhsaker et al. | 375/142 |

(Continued)

*Primary Examiner*—Emmanuel Bayard
(74) *Attorney, Agent, or Firm*—Madson & Austin

(57) ABSTRACT

A spread spectrum communications system uses long, scalable PN sequences to achieve variable communication rates. A low-complexity and scalable matched filter architecture is used to provide a large processing gain and robust recovery of multiple devices in long reach, high ambient-noise environments. The spread spectrum communications system includes a transmitter and a receiver. The receiver includes an RF receiver and a first matched filter receiving data from the RF receiver. A plurality of phase/frequency shifters receives a signal from the first matched filter. A plurality of second matched filters receive data from the plurality of phase/frequency shifters. An equalizer/decoder receives signals from the plurality of phase/frequency shifters.

10 Claims, 2 Drawing Sheets

U.S. PATENT DOCUMENTS

| | | | |
|---|---|---|---|
| 6,493,334 B1 | 12/2002 | Krzymien et al. | 370/342 |
| 6,493,376 B1 | 12/2002 | Harms et al. | 375/130 |
| 6,549,567 B1 | 4/2003 | Fullerton | 375/219 |
| 6,556,621 B1 | 4/2003 | Richards et al. | 375/150 |
| 6,560,270 B1 | 5/2003 | Hischke | 375/136 |
| 6,560,271 B1 | 5/2003 | Han | 375/137 |
| 6,567,017 B1 | 5/2003 | Medlock et al. | 341/50 |
| 6,570,865 B1 | 5/2003 | Masui et al. | 370/342 |
| 6,580,750 B1 | 6/2003 | Aue | 375/150 |
| 6,590,881 B1 | 7/2003 | Wallace et al. | 370/332 |
| RE38,603 E * | 9/2004 | Kim et al. | 375/141 |
| 6,885,691 B1 * | 4/2005 | Lyu | 375/130 |
| 6,934,245 B1 * | 8/2005 | Kwak et al. | 370/204 |

\* cited by examiner

MATCHED FILTER FOR SCALABLE SPREAD SPECTRUM COMMUNICATIONS SYSTEMS

BACKGROUND OF INVENTION

1. Field of the Invention

This invention relates to spread spectrum communications. More specifically, this invention relates a filter and use of long, scalable, separable PN sequences to achieve variable communication rates together with low complexity in spread spectrum communications.

2. Description of Related Art

A variety of spread spectrum communications systems are well known in the art. Often these systems use very long PN codes to achieve processing gain. However, typically, such prior systems have substantial problems with coherence and frequency error and such problems interfere with achieving the objective of robust spread spectrum communications. Typically, these prior systems also require large matched filters to despread signals, where the use of correlators is inappropriate.

Although the following cited U.S. patent documents are not necessarily "prior art," the reader is referred to the following U.S. patent documents for general background material. Each of these patents is hereby incorporated by references in its entirety for the material contained therein.

U.S. Pat. Nos. 4,351,064; 4,953,178; 4,977,578; Re. 33,875; 5,319,672; 5,400,359; 5,471,509; 5,737,368; 5,740,096; 5,790,588; 5,790,590; 5,815,055; 5,881,099; 5,909,461; 5,912,644; 5,926,512; 5,974,082; 5,991,332; 6,031,415; 6,104,746; 6,128,332; 6,154,482; 6,154,487; 6,212,219; 6,233,272; 6,265,807; 6,317,452; 6,331,998; 6,333,925; 6,356,555; 6,434,185; 6,493,334; 6,493,376; 6,549,567; 6,556,621; 6,560,270; 6,560,271; 6,567,017; 6,570,865; 6,580,750; and 6,590,881.

SUMMARY OF INVENTION

It is desirable to provide a method and system for the use of long, scalable PN sequences in long distance spread spectrum communications systems. Moreover it is also desirable to provide a low-complexity matched filter architecture that provides robust recovery of multiple devices in a long reach, high ambient noise environments.

Accordingly, is an object of this invention to provide a method and system for long distance spread spectrum communications systems that makes use of long scalable PN sequences. Moreover, it is an object of this invention to facilitate operation in high ambient noise environments, by increasing processing gain, to thereby provide the capability to trade off data rate for increased robustness in such high ambient noise environments.

Another object of this invention is to provide a method and system for long distance spread spectrum communications system that includes a matched filter with reduced complexity that allows robust recovery of multiple devices in long reach, high ambient noise environments.

A further object of this invention is to provide a method and system for long distance spread spectrum communications systems that provides for scalable data rates. A still further object of this invention is to provide a method and system for long distance spread spectrum communications systems that does not require the locking of the receiver to an individual client device.

A still further object of this invention is to provide a method and system for scaling the complexity of the receiver, including the matched filter structure, to receive and demodulate transmissions from devices possessing very different frequency tolerances.

Another further object of this invention is to provide a method and system for determining the time-of-arrival of a received signal.

Additional objects, advantages, and other novel features of this invention will be set forth in part in the description that follows and in part will become apparent to those of ordinary skill in the art upon examination of the following, or may be learned with the practice of the invention as described herein. The objects and advantages of this invention may be realized and attained by means of the instrumentalities and combinations particularly pointed out in the appended claims. Still other objects of the present invention will become readily apparent to those skilled in the art from the following description wherein there is shown and described the preferred embodiment of the invention, simply by way of illustration of one of the modes best suited to carry out this invention. As it will be realized, this invention is capable of other different embodiments, and its several details and specific circuits are capable of modification in various aspects without departing from the invention. Accordingly, the objects, drawings and descriptions should be regarded as illustrative in nature and not as restrictive.

BRIEF DESCRIPTION OF DRAWINGS

The accompanying drawings incorporated in and forming a part of the specification, illustrate present preferred embodiments of the invention. Some, although not all, alternative embodiments are described in the following description. In the drawings.

Reference will now be made in detail to the present embodiments of the invention, examples of which are illustrated in the accompanying drawings.

DETAILED DESCRIPTION

This invention is a filter designed specifically for scalable spread spectrum communications systems and cooperative techniques for the use of long, scalable Pseudo-Noise ("PN") sequences for variable communication rates. Link distance and performance margins in spread spectrum communications can be increased by increasing processing gain. Processing gain is itself directly related to the length of the PN code employed. For example, where the data rate is constrained to one bit per PN sequence, a PN code length of 1000 yields a processing gain of 30 dB, while a PN code length of 10,000 yields a processing gain of 40 dB. In the present invention, long, scalable PN sequences are used with a low-complexity matched filter architecture to provide variable communication rates, robust recovery of multiple devices in ordinary as well high ambient noise operating environments. In the present invention sites may receive signals, simultaneously or near simultaneously, from a multitude of transmitting devices. Each of these received signals will typically have a corresponding frequency error. Furthermore, the frequency error of the devices may be very different depending on system design objectives, which may be selected to optimize the tradeoffs between variables such as system quality, complexity, cost, and service "class" of the devices. These system requirements tend to preclude locking the receiver to an individual transmitting "client" device in order to achieve frequency coherence across long PN sequences. This invention addresses this problem with a receiver architecture designed so as to facilitate the "simultaneous" receipt of signals, with a wide range of data rates and a wide range of frequency errors, from a variety of devices.

Figure 1:
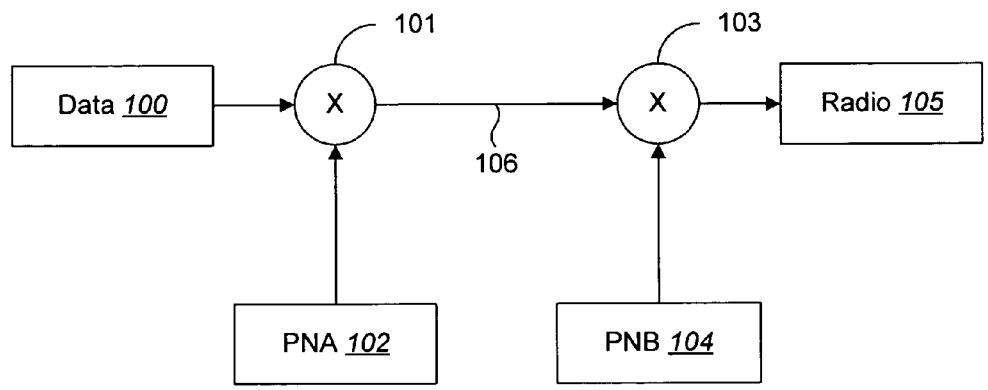
FIG. 1 is a system block diagram showing the major components of one preferred embodiment of the invention.

Referring now to FIG. 1 shows a system block diagram illustrating the major components of one preferred embodiment of the invention. Data bits 100 are spread 101 by a variable length PNA code 102. Typically, this spread 101 operates to spread the data 100 from 1 to 1023 chips, although in alternative embodiments the spread may be varied without departing from the concept of this invention. The resulting chips 106 are further spread 103 by a fixed length PNB code 104. In the present preferred embodiment of the invention, a chipping rate of 5M CPS is used, further scaling the data rates from 19.608 kbps to 38 bits/second, providing processing gains of from 24 dB to 51 dB, respectively, depending on the application requirements and the available signal-to-noise ratio in the available link (communication channel). The resulting spread data is transmitted, typically using a radio transmitter 105 for use with an RF link. Table 107 shows the performance of a variety of PNA code lengths. As can be seen, with a constant chip rate, here 5M CPS, as the PNA code length is increased from 1 to 511, the chips per bit increase from 255 to 130305, the processing gain increases from 24 dB to 51 dB and the data rate is reduced from 19608 to 38 bps. Typically, the length of the fixed length PNB code is designed to be short enough to ensure that the worst case frequency error plus the Doppler shift will cause no more than 180 degrees of phase roll, or a correlation loss in the first matched filter of approximately 4 dB.

Figure 2:
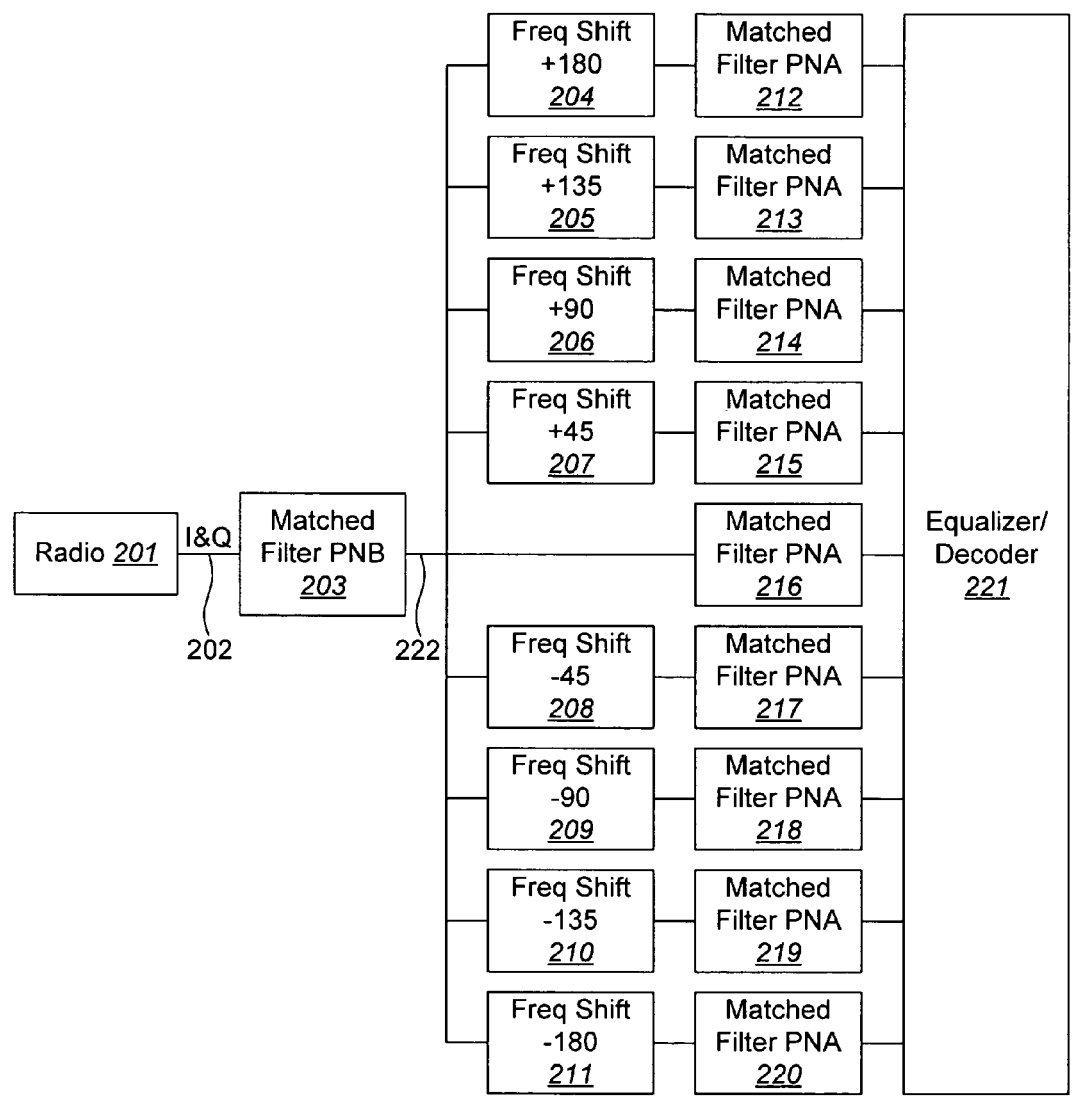
FIG. 2 is a detailed block diagram of the matched filter architecture of one preferred embodiment of the method of this invention.

FIG. 2 shows a detailed block diagram of the matched filter architecture of one preferred embodiment of the method of this invention. The receiver portion of the present data link of this invention includes a radio receiver 201. The output 202 of the receiver 201 provides I & Q channels, which are first processed by a matched filter 203. The matched filter 203 uses the PNB codes as coefficients. Because the frequency can be rolling as much as plus or minus one-hundred eighty degrees across a single PNB code length, a bank of frequency shifters 204, 205, 206, 207, 208, 209, 210, 211 are used prior to sending the filtered data 222 through the PNA matched filters 212, 213, 214, 215, 216, 217, 218, 219, 220. Although, in this FIG. 2 eight frequency shifters and nine matched filters are shown, the number of each actually employed in a particular embodiment of the invention is dependent on the worst-case frequency roll and the allowable phase error across the concatenated PN codes. The frequency shifters 204, 205, 206, 207, 208, 209, 210, 211 perform a complex frequency shift. The matched filters 212, 213, 214, 215, 216, 217, 218, 219, 220 receive data from the frequency shifters 204, 205, 206, 207, 208, 209, 210, 211 and the matched filter 203 and provide a filtered output signal received by the equalizer/decoder 221. The equalizer/decoder 221 examines the outputs of each matched filter 212, 213, 214, 215, 216, 217, 218, 219, 220 and determines the frequency shift of the received signal and appropriately selects the set of most advantageous signals.

It is also notable that two smaller matched filters, rather than one large filter is used presently to despread the spread signal. This means, that in the preferred embodiment of this invention, a single long matched filter can be avoided, thereby considerably reducing the amount of signal processing hardware that is required.

The described embodiment of this invention is to be considered in all respects only as illustrative and not as restrictive. Although specific steps and associated formulas are provided, the invention is not limited thereto. The scope of this invention is, therefore, indicated by the claims rather than by the foregoing description. All changes, which come within the meaning and range of equivalency of the claims, are to be embraced within their scope.

The invention claimed is:

1. A spread spectrum communications system, comprising:
   (A) a transmitter, said transmitter further comprising:
   (1) a data source;
   (2) a first multiplier/mixer spreading data from said data source with a first pseudo noise source;
   (3) a second multiplier/mixer spreading data from said first mixer with a second pseudo noise source;
   (4) an RE transmitter;
   (B) a receiver, said receiver further comprising:
   (1) an RE receiver;
   (2) a first matched filter receiving data from said RE receiver;
   (3) a plurality of phase/frequency shifters, receiving a signal from said first matched filter;
   (4) a plurality of second matched filters receiving data from said plurality of phase/frequency shifters; and
   (5) an equalizer/decoder receiving signals from said plurality of phase/frequency shifters.

2. A spread spectrum communications system, as recited in claim 1, wherein said first pseudo noise source provides a variable length code sequence.

3. A spread spectrum communications system, as recited in claim 1, wherein said second pseudo noise source provides a fixed length code sequence.

4. A spread spectrum communications system, as recited in claim 1, wherein said first multiplier mixer spreads said data from said data source with a variable PN code.

5. A spread spectrum communications system, as recited in claim 1, wherein said second multiplier mixer spreads said data from said first mixer with a fixed length PN code.

6. A spread spectrum communications system, as recited in claim 1, wherein said first matched filter further comprises a set of coefficients correlated to said second pseudo noise source.

7. A spread spectrum communications system, as recited in claim 1, wherein said plurality of phase/frequency shifters are offset from each other by one or more degrees/Hz.

8. A spread spectrum communications system, as recited in claim 1, wherein said second matched filters are correlated to said first pseudo noise source.

9. A spread spectrum communications system, as recited in claim 1, wherein said first and said second pseudo noise sources may be scaled to longer or shorter fixed or variable code lengths to optimize variables such as connection quality, system complexity, overall implementation cost and service "classes" of devices.

10. A spread spectrum communications system, as recited in claim 1, wherein said equalizer/decoder selects an advantageous set of signals from said received signals from said plurality of phase/frequency shifters.

* * * * *

UNITED STATES PATENT AND TRADEMARK OFFICE
CERTIFICATE OF CORRECTION

| | |
|---|---|
| PATENT NO. | : 7,092,426 B2 |
| APPLICATION NO. | : 10/670708 |
| DATED | : August 15, 2006 |
| INVENTOR(S) | : W. Kurt Dobson et al. |

It is certified that error appears in the above-identified patent and that said Letters Patent is hereby corrected as shown below:

Column 4, line 21, "RE transmitter" should be --RF transmitter --.
Column 4, line 23, "RE receiver" should be --RF receiver --.
Column 4, line 24, "said RE" should be --said RF--.

Signed and Sealed this

Twenty-fourth Day of April, 2007

JON W. DUDAS
*Director of the United States Patent and Trademark Office*